United States Patent
Kanaya

(10) Patent No.: US 12,504,861 B2
(45) Date of Patent: Dec. 23, 2025

(54) INFORMATION PROCESSING APPARATUS AND METHOD AND NON-TRANSITORY COMPUTER READABLE MEDIUM

(71) Applicant: FUJIFILM Business Innovation Corp., Tokyo (JP)

(72) Inventor: Ryo Kanaya, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 522 days.

(21) Appl. No.: 17/888,110

(22) Filed: Aug. 15, 2022

(65) Prior Publication Data

US 2023/0266861 A1 Aug. 24, 2023

(30) Foreign Application Priority Data

Feb. 22, 2022 (JP) ................... 2022-025257

(51) Int. Cl.
*G06V 30/418* (2022.01)
*G06F 3/0482* (2013.01)
*G06V 30/42* (2022.01)
*G06V 30/412* (2022.01)

(52) U.S. Cl.
CPC .......... *G06F 3/0482* (2013.01); *G06V 30/418* (2022.01); *G06V 30/42* (2022.01); *G06V 30/412* (2022.01)

(58) Field of Classification Search
CPC .................. G06F 3/048–05; G06V 30/418
See application file for complete search history.

(56) References Cited

U.S. PATENT DOCUMENTS

| | | | | |
|---|---|---|---|---|
| 7,185,008 | B2 * | 2/2007 | Kawatani | G06F 16/353 |
| | | | | 707/999.005 |
| 8,509,525 | B1 * | 8/2013 | Urbach | G06V 30/412 |
| | | | | 382/173 |
| 9,659,084 | B1 * | 5/2017 | Zhang | G06F 3/048 |
| 11,494,051 | B1 * | 11/2022 | Davis | G06V 20/20 |
| 2003/0014388 | A1 * | 1/2003 | Shih | G06F 16/353 |
| 2005/0097436 | A1 * | 5/2005 | Kawatani | G06F 18/217 |
| | | | | 707/E17.09 |

(Continued)

FOREIGN PATENT DOCUMENTS

| | | |
|---|---|---|
| JP | 2002-334333 A | 11/2002 |
| JP | 2005-182133 A | 7/2005 |

OTHER PUBLICATIONS

English Translation of Figs. 4 and 6 of JP2002334333 (Year: 2002).*

(Continued)

*Primary Examiner* — Daniel Rodriguez
(74) *Attorney, Agent, or Firm* — Oliff PLC

(57) ABSTRACT

An information processing apparatus includes a processor configured to: obtain plural first document images; execute classification processing for classifying each of the plural first document images, based on reliability of each of plural second document images in relation to each of the plural first document images, each of the plural second document images being preset in accordance with a classification type; and perform display control to display a first group of the plural first document images and a second group of the plural second document images on an identical screen and also to display results of the classification processing on the identical screen.

7 Claims, 12 Drawing Sheets

(56) References Cited

U.S. PATENT DOCUMENTS

| | | | | |
|---|---|---|---|---|
| 2007/0094600 | A1* | 4/2007 | Sullivan | G06F 16/16 715/711 |
| 2007/0110277 | A1* | 5/2007 | Hayduchok | G06V 30/2253 382/101 |
| 2007/0211964 | A1* | 9/2007 | Agam | G06V 10/771 382/305 |
| 2008/0104506 | A1* | 5/2008 | Farzindar | G06F 16/345 707/999.1 |
| 2011/0221782 | A1* | 9/2011 | Ito | G06F 16/93 345/671 |
| 2012/0148120 | A1 | 6/2012 | Yagi et al. | |
| 2014/0122486 | A1* | 5/2014 | Simard | G06N 20/00 707/737 |
| 2014/0355073 | A1* | 12/2014 | Beato | H04N 1/00782 358/449 |
| 2016/0162476 | A1* | 6/2016 | Munro | G06F 40/137 704/9 |
| 2017/0372439 | A1* | 12/2017 | Smith | G06V 30/416 |
| 2018/0314939 | A1* | 11/2018 | Skiles | G06F 3/04842 |
| 2019/0121840 | A1* | 4/2019 | Abbott | G06F 40/106 |
| 2021/0056254 | A1* | 2/2021 | Kinoshita | G06F 3/0484 |
| 2022/0392047 | A1* | 12/2022 | Wheaton | G06V 10/40 |
| 2023/0214428 | A1* | 7/2023 | Attar | G06V 30/1444 707/739 |

OTHER PUBLICATIONS

Jun. 15, 2023 extended Search Report issued in European Patent Application No. 22199923.8.

Nov. 11, 2025 Office Action issued in Japanese Patent Application No. 2022-025257.

* cited by examiner

INFORMATION PROCESSING APPARATUS AND METHOD AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-025257 filed Feb. 22, 2022.

BACKGROUND

(i) Technical Field

The present disclosure relates to an information processing apparatus and method and a non-transitory computer readable medium.

(ii) Related Art

Japanese Unexamined Patent Application Publication No. 2002-334333, for example, discloses an apparatus for determining a format of each of read document images and sorting the document images according to the format. The apparatus includes a determiner, a storage, and a user interface. The determiner determines the format of a selected document image, based on the degree of similarity between the selected document image and a registered document image whose format is known. The storage stores judging information in association with a document image whose format is determined. The judging information is used for judging whether it is necessary for a user to check a determination result of the determiner. The user interface presents a document image which is determined to be necessary to be checked by the user based on the judging information stored in the storage. The user interface instructs the user to check a sorting result of the document image and to correct it.

SUMMARY

After document images are classified based on predetermined document images, a user may be required to classify an unclassified document image and also to check the classification results of the document images. In this case, a user selects one of the unclassified document images or one of the classified document images on a selection screen and then shifts to a comparison screen to compare the selected document image with the predetermined document images. In this manner, the user is required to shift between the selection screen and the comparison screen, which makes it difficult to improve user operability.

Aspects of non-limiting embodiments of the present disclosure relate to making it possible to improve user operability, which may be difficult to achieve in the configuration in which a user is required to shift between a selection screen and a comparison screen.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: obtain plural first document images; execute classification processing for classifying each of the plural first document images, based on reliability of each of plural second document images in relation to each of the plural first document images, each of the plural second document images being preset in accordance with a classification type; and perform display control to display a first group of the plural first document images and a second group of the plural second document images on an identical screen and also to display results of the classification processing on the identical screen.

BRIEF DESCRIPTION OF THE DRAWINGS

An exemplary embodiment of the present disclosure will be described in detail based on the following figures, wherein.

DETAILED DESCRIPTION

An exemplary embodiment of the disclosure will be described below in detail with reference to the accompanying drawings.

Figure 1:
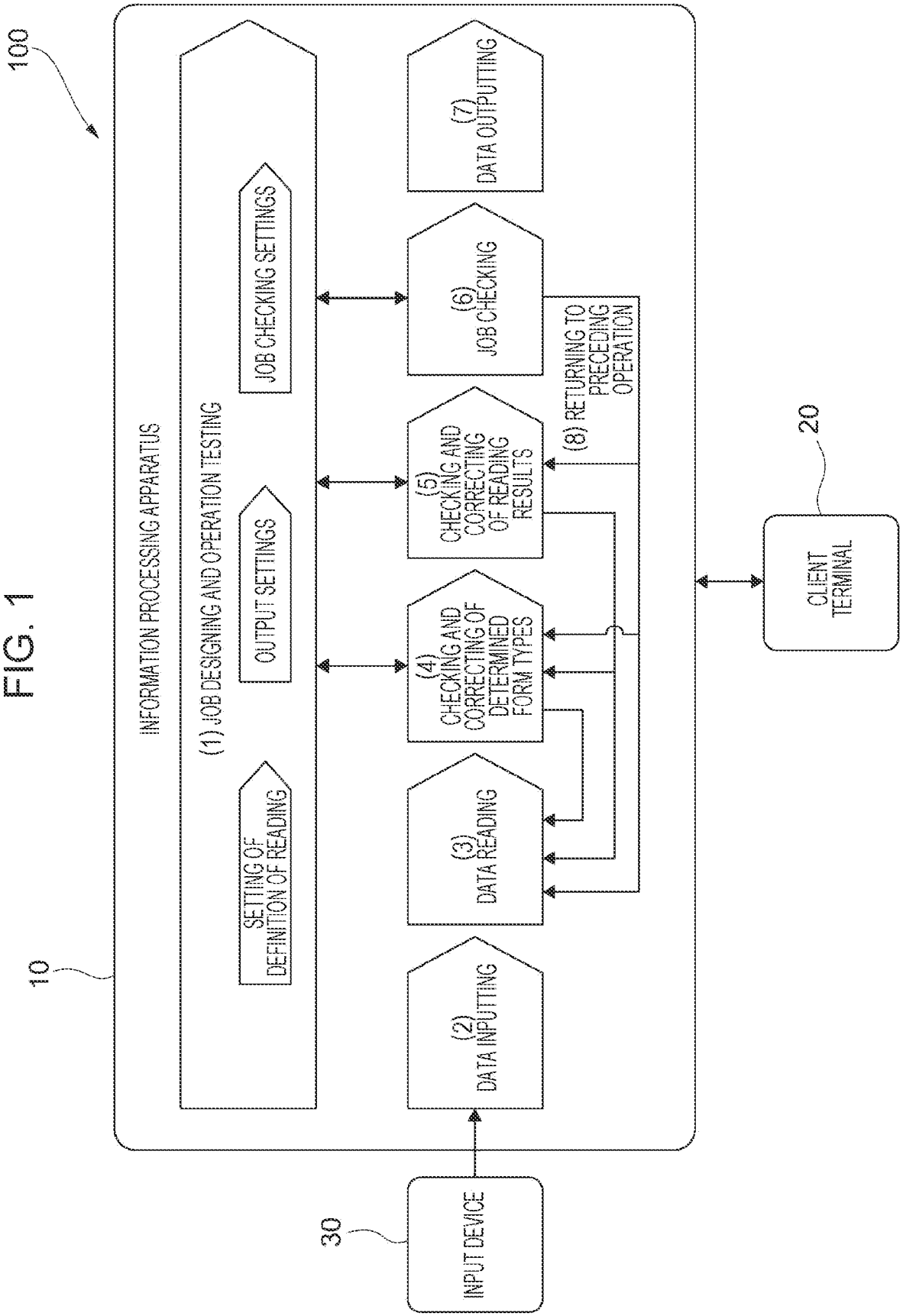
FIG. 1 is a schematic diagram illustrating the configuration of a form system.

FIG. 1 is a schematic diagram illustrating the configuration of a form system 100.

The form system 100 shown in FIG. 1 includes an information processing apparatus 10. The information processing apparatus 10 is connected to a client terminal 20 and an input device 30 so that they can communicate with each other.

As a network which connects the information processing apparatus 10 to the client terminal 20 and the input device 30, a local area network (LAN) or the internet, for example, is used. A composite network of a LAN and the internet may alternatively be used.

The information processing apparatus 10 manages a procedure of a series of operations concerning optical character recognition (OCR) processing, that is, from when OCR processing is performed on image data of a document including multiple forms input via the input device 30 until when OCR processing results are output to a predetermined output destination. The specific configuration and operation of the information processing apparatus 10 will be discussed later.

The client terminal 20 sends various instructions regarding OCR processing to the information processing apparatus 10. Examples of the instructions are an instruction to start reading information of image data and an instruction to display the results of reading information of image data. The client terminal 20 also displays various items of information, such as the results of OCR processing performed by the information processing apparatus 10 in accordance with various instructions received from the client terminal 20 and notification information about OCR processing.

As the client terminal 20, a general-purpose computer, such as a server or a personal computer (PC), for example, is used. In FIG. 1, only one client terminal 20 is shown. However, plural client terminals 20 may be disposed and be used separately in accordance with the type of processing.

The input device 30 inputs image data to be subjected to OCR processing into the information processing apparatus 10. Examples of the input device 30 are a general-purpose computer, such as a server or a computer, and an image forming device having multiple functions, such as a scan function, a printer function, and a FAX function.

In addition to the input device 30, the client terminal 20 may also input image data into the information processing apparatus 10.

An overview of the form system 100 will be explained below.

The form system 100 is a system in which the information processing apparatus 10 performs OCR processing on image data received via the input device 30 and outputs OCR processing results to a predetermined output destination.

The information processing apparatus 10 manages various processing operations regarding OCR processing including: (1) job designing and operation testing; (2) data inputting; (3) data reading; (4) checking and correcting of determined form types; (5) checking and correcting of reading results; (6) job checking; (7) data outputting; and (8) returning to a preceding operation. In the exemplary embodiment, OCR processing refers to, not only processing for simply reading characters and symbols, for example, from image data, but also postprocessing, such as correcting of read characters.

Among various processing operations managed by the information processing apparatus 10, (1) job designing and operation testing, (2) data inputting, (3) data reading, (6) job checking, and (7) data outputting are automatically executed by the information processing apparatus 10. In contrast, (4) checking and correcting of determined form types and (5) checking and correcting of reading results are performed by a user and the checking and correcting results are received from the user via the client terminal 20. The processing of (8) returning to a preceding operation is automatically executed by the information processing apparatus 10 or is performed by a user via the client terminal 20 depending on the situation.

In the processing of (1) job designing and operation testing, job rules including a setting of the definition of reading, output settings, and job checking settings are created. As an example of the setting of the definition of reading, a reading range, which is a range where information of image data is read in (3) data reading, is set. More specifically, reading an item value as a "value" somewhere from the right side of an item extracted as a "key", for example, is set as the definition of reading. As an example of the output settings, the file format and the output destination of output data to be output in (7) data outputting are set. As an example of the job checking settings, the format of a form, which is to be checked in (6) job checking, such as required input items and the number of characters that can be input, is set.

In the processing of (2) data inputting, the input of image data from the input device 30 is received. For example, uploading of data from a local PC via a browser, inputting of data in collaboration with a cloud storage service, and inputting of data into a hot folder from a PC are received.

Received image data is registered as a job, which is an execution unit of the processing of (3) data reading.

In the processing of (3) data reading, among the job rules created in (1) job designing and operation testing, job rules, which are set for a job to be executed and selected by a user, are used to read information of image data included in this job. As examples of the processing of (3) data reading, form types of forms included in the image data of this job are determined, and characters and symbols within the reading range are read.

In the processing of (4) checking and correcting of determined form types, the image data included in the job is divided into records, each of which indicates forms included in the job, based on the results of determining the form types in (3) data reading. Then, a record is displayed, and the results of checking and correcting the determined form types performed by a user are received. Based on the above-described results, the job may be divided into individual forms.

A job may be aggregation of multiple form images of the same type. In the exemplary embodiment, however, it is assumed that a job is aggregation of plural sets of different types of forms, each set being constituted by different types of forms included in an application. That is, plural types of form images are included in a job. The aggregation of different types of form images included in one set is called a record.

In the processing of (5) checking and correcting of reading results, the reading results of characters and symbols within the reading range executed in (3) data reading are displayed and are checked. If some of the reading results are not correct, they are corrected or returned to a preceding operation. A function of detecting errors in advance to save the trouble of checking and correcting by a user may be provided. With this function, correcting results are checked against a predetermined database and conversion data is displayed on a screen.

In the processing of (6) job checking, among the job rules created in (1) job designing and operation testing, the job checking settings included in the job rules, which are set for a job to be executed and selected by a user, are used to detect errors of each of the preceding operations. The checking results may be presented to a user, so that the user can correct the results or return them to a preceding operation.

In the processing of (7) data outputting, among the job rules created in (1) job designing and operation testing, the output settings included in the job rules, which are set for a job to be executed and selected by a user, are used to create output data. The created output data is output to a predetermined output destination.

In the processing of (8) returning to a preceding operation, the operation executed during the OCR processing is returned to a preceding operation by one or plural processing stages. In one example of the returning processing, while performing (4) checking and correcting of determined form types or (5) checking and correcting of reading results, an instruction to return to a preceding operation is provided from a user using the client terminal 20. In another example of the returning processing, an instruction to return to a preceding operation is provided from an administrator by using his/her client terminal 20, based on the results of checking made by the administrator between (6) job checking and (7) data outputting.

In the above-described OCR processing, the processing of (1) job designing and operation testing is executed before the execution of (3) data reading onwards, that is, before the operation of the form system 100 is started. The processing of (1) job designing and operation testing may be executed during the operation of the form system 100, that is, while (3) data reading onwards is being executed. In one example, the job rules created in (1) job designing and operation testing before the start of the form system 100 may be corrected in accordance with the results of (5) checking and correcting of reading results obtained during the operation of the form system 100.

If an unclassified form is found in (4) checking and correcting of determined form types, a user is required to return to a list of unclassified forms, select a form to be classified, shift to a comparison screen to compare the image of the unclassified form with preregistered images, classify the form, then return back to the list of unclassified forms, and select another unclassified form. In this manner, returning to the list of unclassified forms every time an unclassified form is found is burdensome for the user. If a wrongly classified form is found, a user is also required to follow a procedure similar to that for an unclassified form.

To address this issue, in the exemplary embodiment, the image of an unclassified form or a wrongly classified form and preregistered images are displayed on the same screen, and classifying results or sorting results are also displayed on the same screen. This reduces the number of transition times of the screen, which decreases the burden on a user. This will be discussed specifically.

Figure 2:
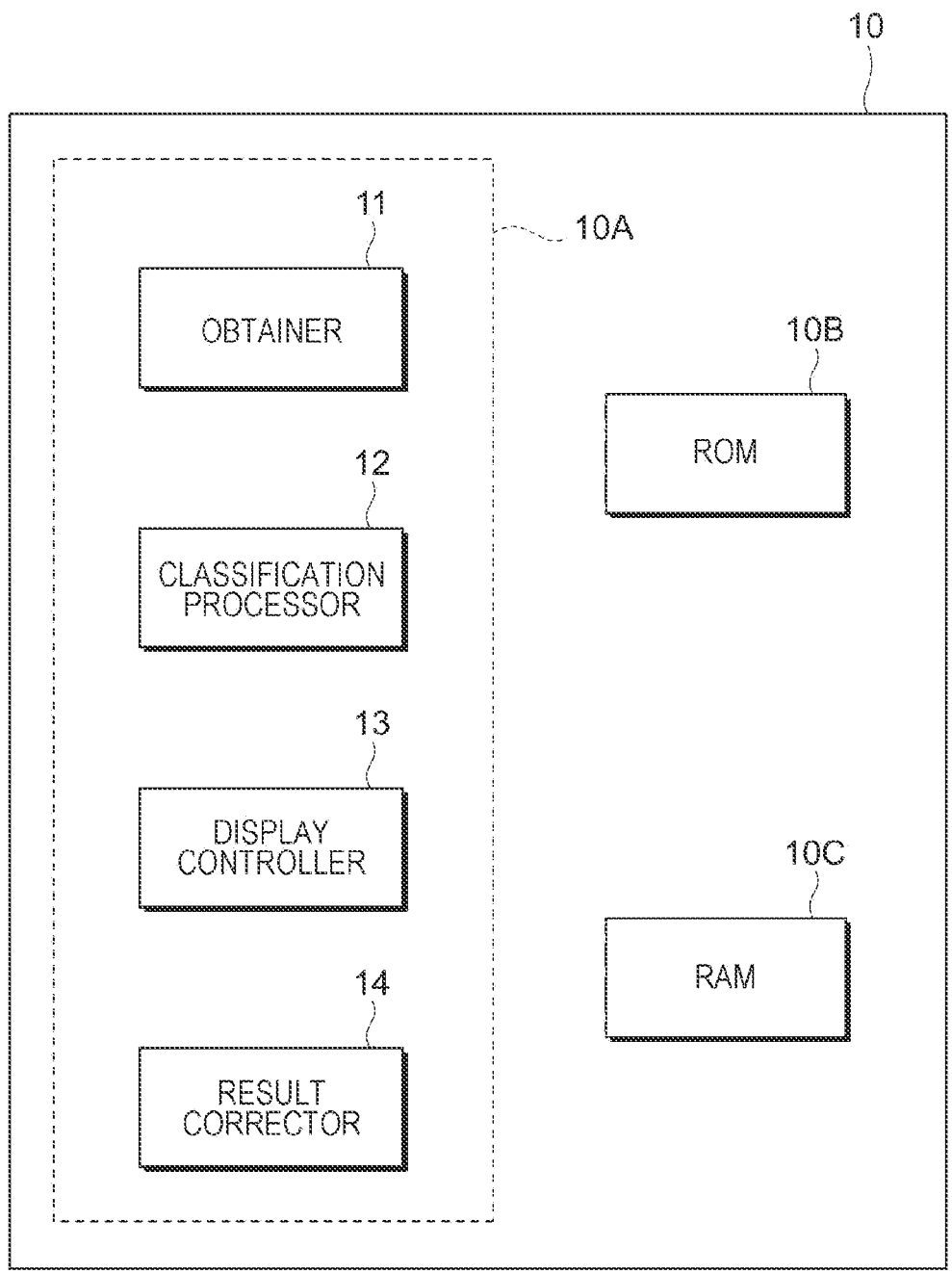
FIG. 2 is a functional block diagram of an information processing apparatus.

FIG. 2 is a functional block diagram of the information processing apparatus 10.

As shown in FIG. 2, the information processing apparatus 10 includes an obtainer 11, a classification processor 12, a display controller 13, and a result corrector 14.

The obtainer 11 obtains image data received in (2) data inputting. That is, the obtainer 11 obtains images to be classified from the input device 30.

The obtainer 11 also obtains preregistered images from the input device 30. Each preregistered image is preset in accordance with the classification type and is registered in advance to determine the classification type of an image to be classified.

Images to be classified and preregistered images are document images and are stored in a storage, such as a hard disk drive (HDD) (not shown), after they are obtained by the obtainer 11.

In the exemplary embodiment, a specific example of the classification type is a form type.

The classification processor 12 determines form types of images included in each record in the processing of (3) data reading. That is, the classification processor 12 executes classification processing for each image to be classified, based on the degree of reliability of a preregistered image in relation to this image. As a result, a classification processing result is set for each image subjected to classification processing.

To calculate the degree of reliability, a known algorithm may be used. An example of the known algorithm is pattern matching using feature vectors and templates. Another example is a neural network implemented by machine learning conducted by using images to be compared with each other as input and the reliability of one image in relation to the other image as output.

The display controller 13 performs control to display classification processing results on a screen in the processing of (4) checking and correcting of determined form types. That is, the display controller 13 displays a screen to be used by a user to check and correct the classification processing results. Details will be discussed later.

The result corrector 14 receives correction made to the classification processing results by a user in the processing of (4) checking and correcting of determined form types. The received correction is reflected in the display mode of the screen by the display controller 13. Details will be discussed later.

The functions of the information processing apparatus 10 are implemented by a central processing unit (CPU) 10A, which is an example of a processor. The CPU 10A reads a program stored in a read only memory (ROM) 10B and executes the program by using a random access memory (RAM) 10C as a work area. The program to be executed by the CPU 10A may be provided to the information processing apparatus 10 while being stored in a computer readable medium, such as a magnetic recording medium (magnetic tape and a magnetic disk, for example), an optical recording medium (optical disc, for example), a magneto-optical recording medium, and a semiconductor memory. The program to be executed by the CPU 10A may be downloaded to the information processing apparatus 10 via a communication medium, such as the internet.

Although the functions of the information processing apparatus 10 are implemented by software in the exemplary embodiment, they may be implemented by hardware, such as an application specific integrated circuit (ASIC).

Figure 3:
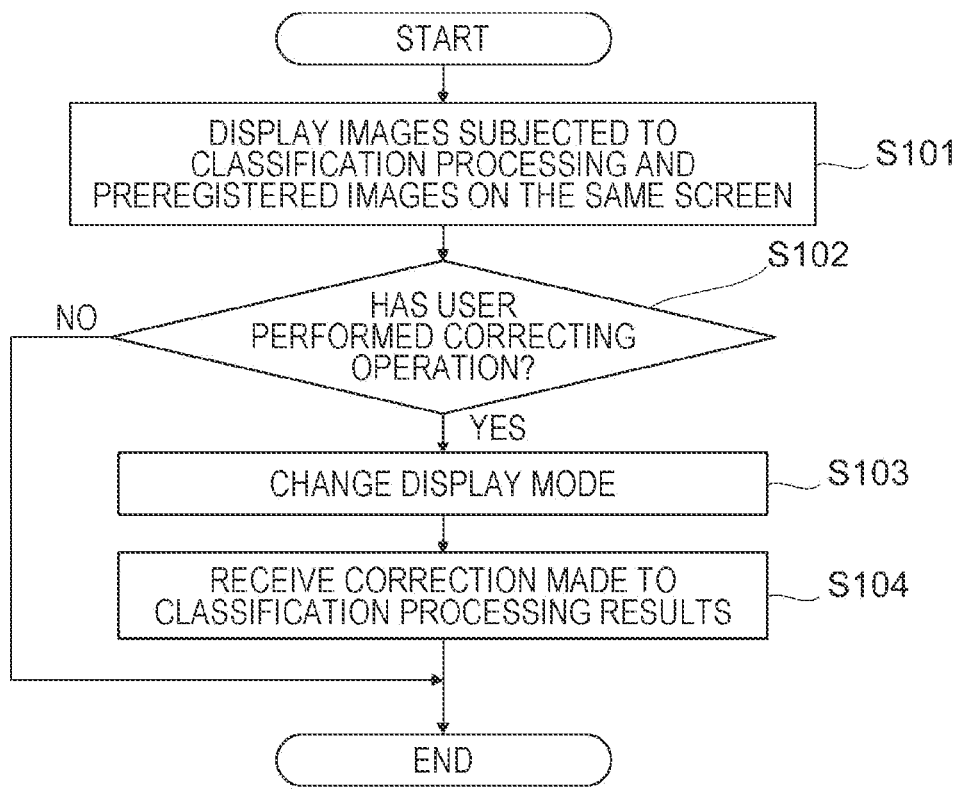
FIG. 3 is a flowchart illustrating checking and correcting processing for determined form types according to the exemplary embodiment.

FIG. 3 is a flowchart illustrating checking and correcting processing for determined form types according to the exemplary embodiment. The processing shown in FIG. 3 is an example of the processing of (4) checking and correcting of determined form types by using the classification processing results obtained in (3) data reading.

In the processing example in FIG. 3, in step S101, images subjected to classification processing in (3) data reading and preregistered images used in the classification processing are displayed on the same screen, together with the classification processing results. The display controller 13 (see FIG. 2) displays this screen.

It is then judged in step S102 whether a user has performed a correcting operation on the content displayed on the screen. If the user has performed a correcting operation (YES in step S102), the display controller 13 changes the display mode on the screen in step S103. In step S104, the correction made to the classification processing results is received by the result corrector 14. If it is found in step S102 that the user has not performed a correcting operation, the processing in FIG. 3 is terminated.

A screen 40 displayed on a display (not shown) of the information processing apparatus 10 will be explained below.

Figure 4:
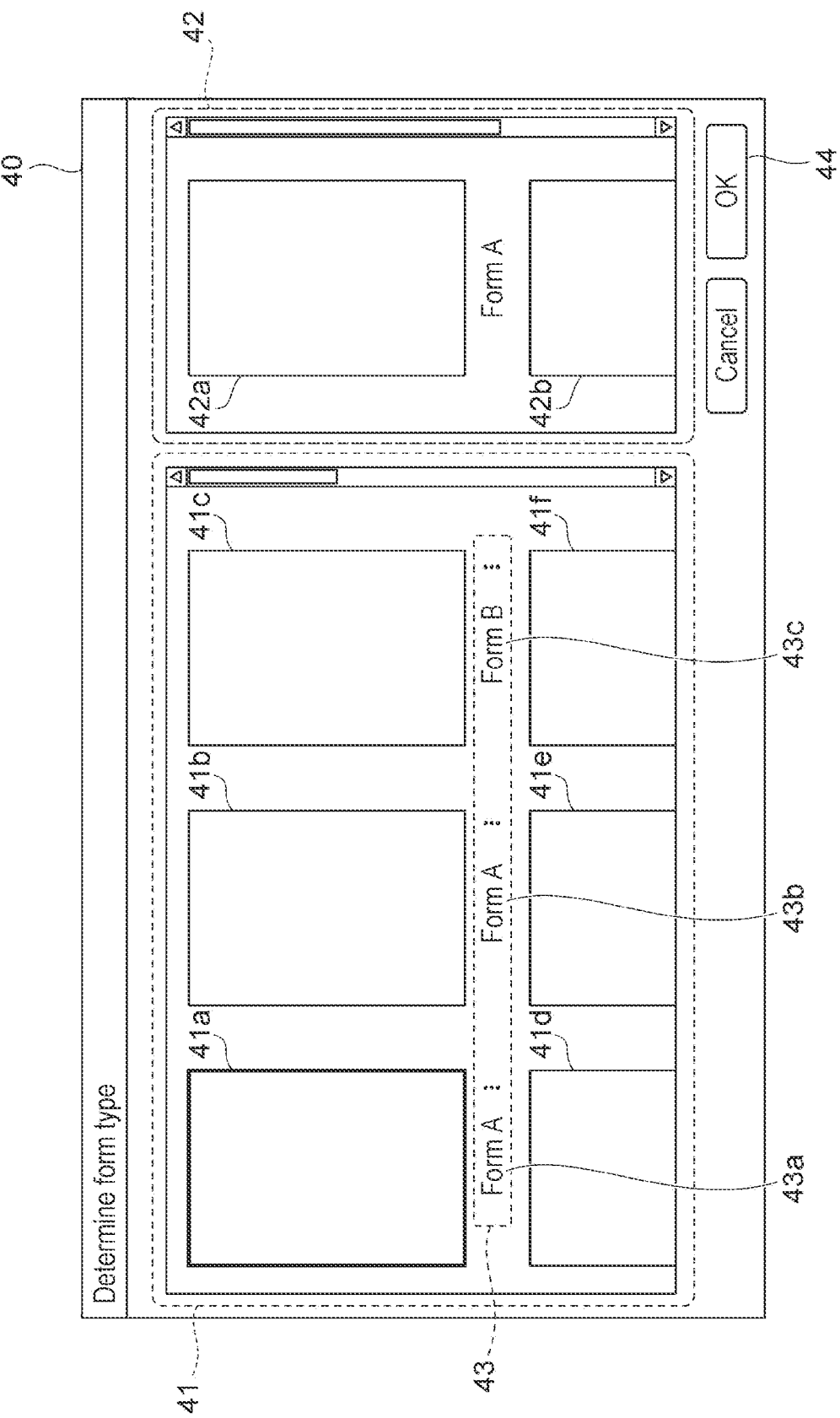
FIG. 4 illustrates a screen for explaining a case in which a group of images subjected to classification processing, a group of preregistered images, and classification processing results are displayed on the same screen.

The screen 40 shown in FIG. 4 is an example of the identical screen on which a group of images subjected to classification processing (such images may simply be called subject images), a group of preregistered images, and classification processing results are displayed. The screen 40 is an example of the screen displayed in step S101 (see FIG. 3).

The screen 40 includes a subject image display region 41 where images subjected to classification processing are displayed, a preregistered image display region 42 where preregistered images are displayed, a result display region 43 where classification processing results are displayed, and an instruction region 44 for giving an instruction to proceed to the next screen.

In the example in FIG. 4, the screen 40 is displayed on one display unit. However, the screen 40 may be displayed on plural display units in a distributed manner. That is, the term "the same screen" includes the meaning that the same screen is displayed on one display unit and the meaning that the same screen is displayed on plural display units in a distributed manner.

The subject image display region 41 is a region where a group of images subjected to classification processing is displayed. More specifically, in the subject image display region 41 in the example of FIG. 4, subject images 41a, 41b, 41c, 41d, 41e, and 41f are displayed as a group.

Among the subject images 41a through 41f, the subject image 41a is only indicated by the thick lines, which shows that the subject image 41a is being selected. A subject image to be selected may be determined in advance. For example, the subject image located on the topmost and leftmost position of the subject image display region 41 may be determined as an image to be selected.

In the result display region 43, individual classification processing results are displayed as form types 43a, 43b, and 43c corresponding to the subject images 41a, 41b, and 41c, respectively. More specifically, the subject images 41a and 41b are classified as form A, while the subject image 41c is classified as form B.

As a result of scrolling down on the screen 40, the classification processing results of the subject images 41d through 41f are displayed at certain positions of the result display region 43, though they are not shown.

The classification processing results displayed in the result display region 43 are checked by a user and are corrected if necessary. As the classification processing results of some subject images, the form types are clearly indicated. However, for some subject images, the form types may be unknown, in which case, a user classifies such a subject image or returns it to a preceding operation.

The preregistered image display region 42 is a region where a group of plural preregistered images is displayed. More specifically, in the preregistered image display region 42 in FIG. 4, preregistered images 42a and 42b are displayed as a group, and a user can identify from text "form A" indicated under the preregistered image 42a that the preregistered image 42a has been registered as form A. The preregistered image 42b has been registered as a form different from form A, such as form B.

For each of form A and form B, which are examples of form types (classification types), the format of an invoice, a quotation, or a transportation expenses application, for example, is preset.

As described above, in the exemplary embodiment, a group of images subjected to classification processing and a group of preregistered images are displayed on the screen 40, and the classification processing results are also displayed on the screen 40. This reduces the number of transition times of the screen, which decreases the burden on a user.

Additionally, the subject image display region 41 occupies a larger area of the screen 40 than the preregistered image display region 42. More specifically, while the subject images 41a through 41f are arranged in three columns in the subject image display region 41, the preregistered images 42a and 42b are arranged in one column in the preregistered image display region 42.

The reason for this is that, typically, the number of images subjected to classification processing to be displayed in the subject image display region 41 is greater than that of preregistered images to be displayed in the preregistered image display region 42. Between a group of images subjected to classification processing and a group of preregistered images, the display controller 13 (see FIG. 2) preferentially displays a group of greater number of images over the other group. If images subjected to classification processing are fewer than preregistered images, the subject image display region 41 occupies a smaller area of the screen 40 than the preregistered image display region 42.

In the above-described example, the sizes of the subject image display region 41 and the preregistered image display region 42 are automatically determined. However, a user may be able to set which one of the subject image display region 41 and the preregistered image display region 42 is to occupy a larger area of the screen 40.

The subject images 41a through 41f (images subjected to classification processing) are examples of a first document image, and the group of the subject images 41a through 41f is an example of a first group. The preregistered images 42a and 42b are examples of a second document image, and the group of the preregistered images 42a and 42b is an example of a second group. The form types 43a, 43b, and 43c are examples of results of classification processing.

Preregistered images may be displayed in a predetermined arrangement order, such as in order of frequency of appearance or reliability. Subject images to be displayed in the subject image display region 41 may be filtered, and based on the filtering result, subject images to be displayed and those not to be displayed may be switched.

Correcting of a classification processing result will be explained below. FIGS. 5A through 6B show a case in which the form type of an image subjected to classification processing is unknown. FIGS. 7A and 7B show a case in which an image subjected to classification processing is classified as a wrong form type. The same explanation and the same illustration for the case in FIGS. 5A through 6B and for the case in FIGS. 7A and 7B may not be repeated.

FIGS. 5A through 6B illustrate a screen 40 when a user makes correction to a classification processing result. The screen 40 in FIGS. 5A through 6B is shown in chronological order. In FIGS. 7A and 7B, the screen 40 is also shown in chronological order.

Figure 5A:
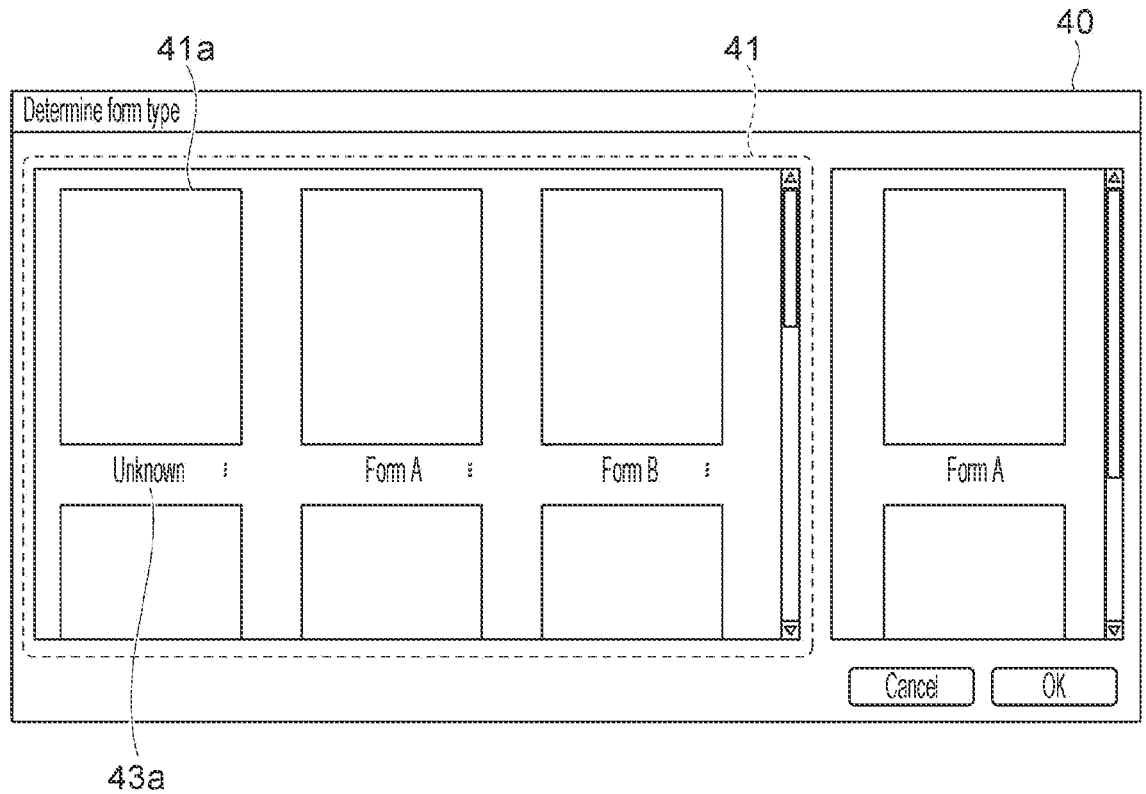
FIGS. 5A through 6B illustrate the transition of the same screen in chronological order to correct a classification processing result.
Figure 6A:
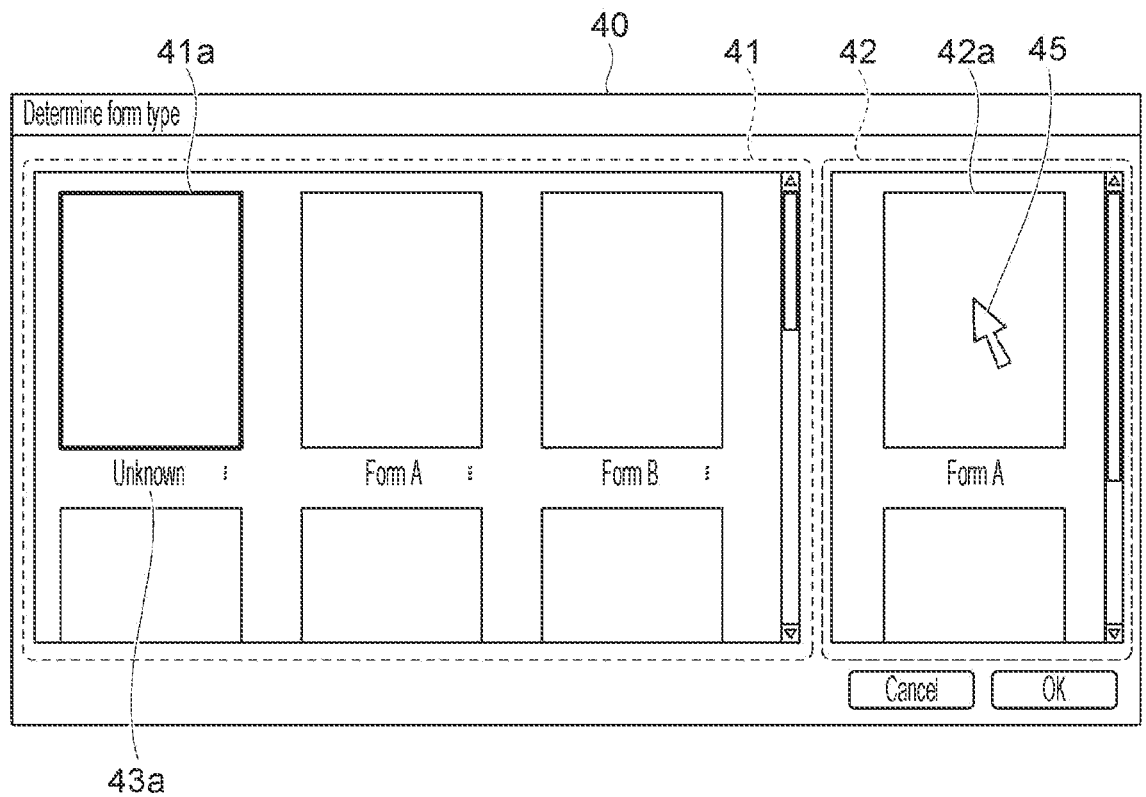

In the subject image display region 41 of the screen 40 shown in FIG. 5A, the classification processing result of the subject image 41a is "unknown" as indicated by the form type 43a in the result display region 43. That is, the subject image 41a is not classified as any form type of the preregistered images in the preregistered image display region 42.

Figure 5B:
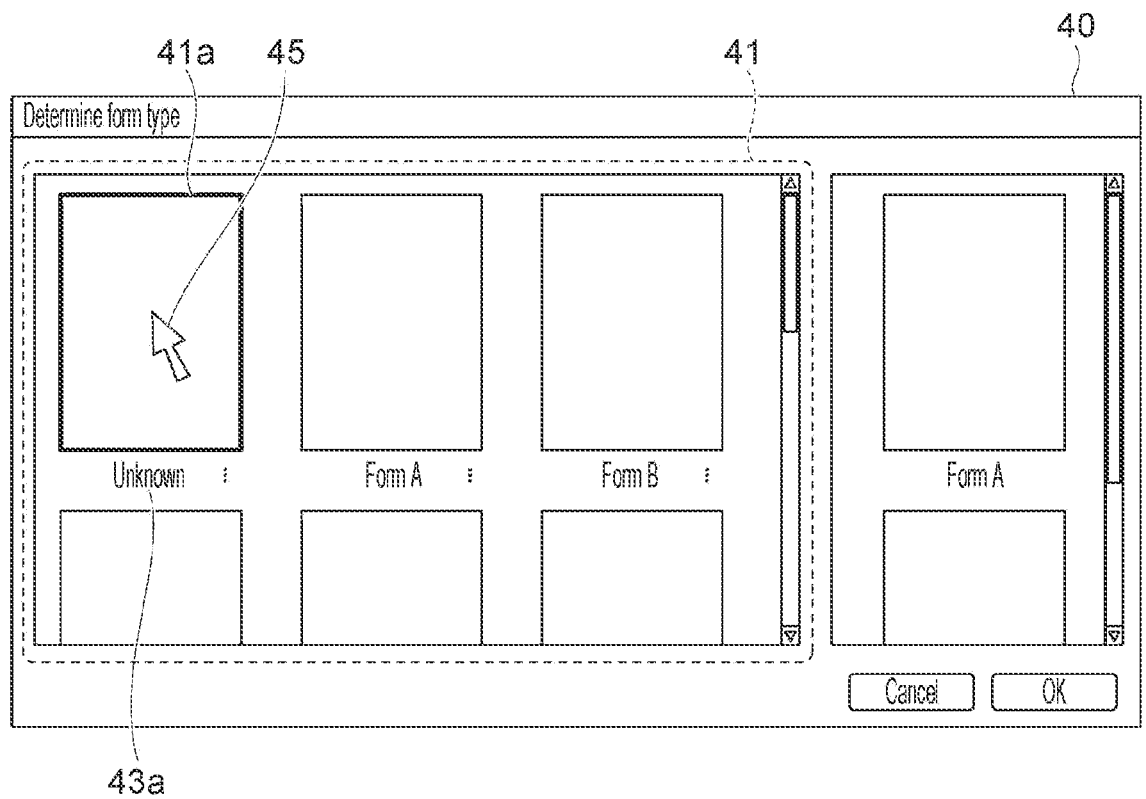

To deal with this situation, a user places a cursor 45 over the subject image 41a and clicks, as shown in FIG. 5B, and then, the display mode of the subject image 41a is changed to indicate that the subject image 41a is being selected. That is, the display controller 13 (see FIG. 2) displays the subject image 41a in a mode to show that the subject image 41a is being selected, more specifically, the display controller 13 displays the subject image 41a with thicker lines than those for the other subject images.

The screen 40 in FIG. 5B corresponds to step S103 in the flowchart of FIG. 3 in which the display mode is changed after it is found in step S102 that a correcting operation is performed.

The user then specifies a form type of the subject image 41a whose form type is "unknown". That is, the user selects one of the preregistered images, such as the preregistered image 42a, in the preregistered image display region 42. In the example in FIG. 6A, the user places the cursor 45 over the preregistered image 42a whose form type is form A and then clicks.

Figure 6B:
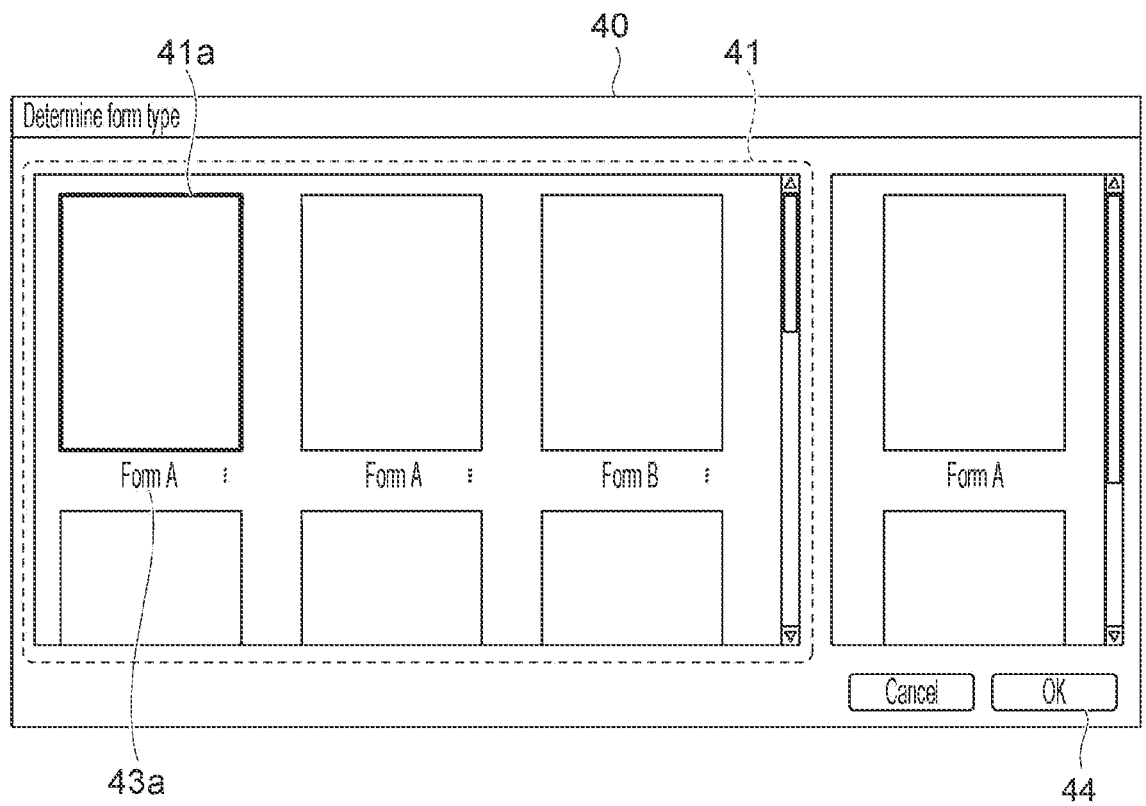
Figure 7A:
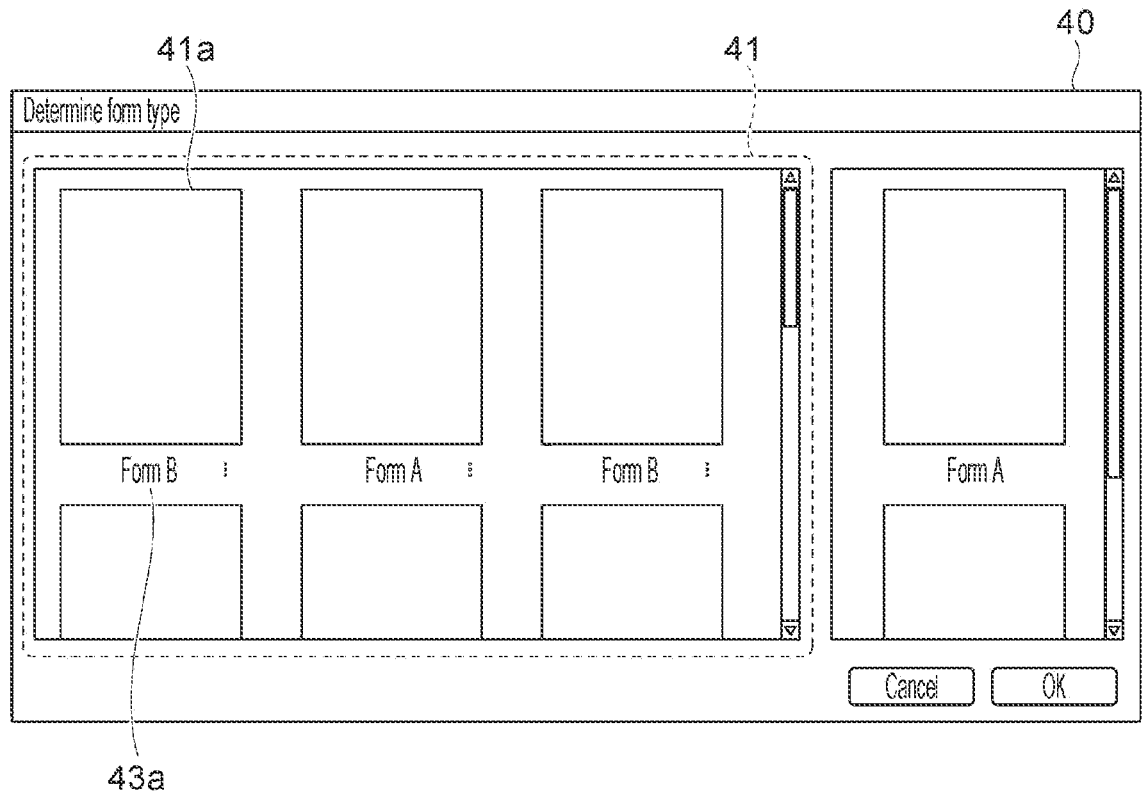
FIGS. 7A and 7B illustrate the transition of the same screen in chronological order to correct a classification processing result.
Figure 7B:
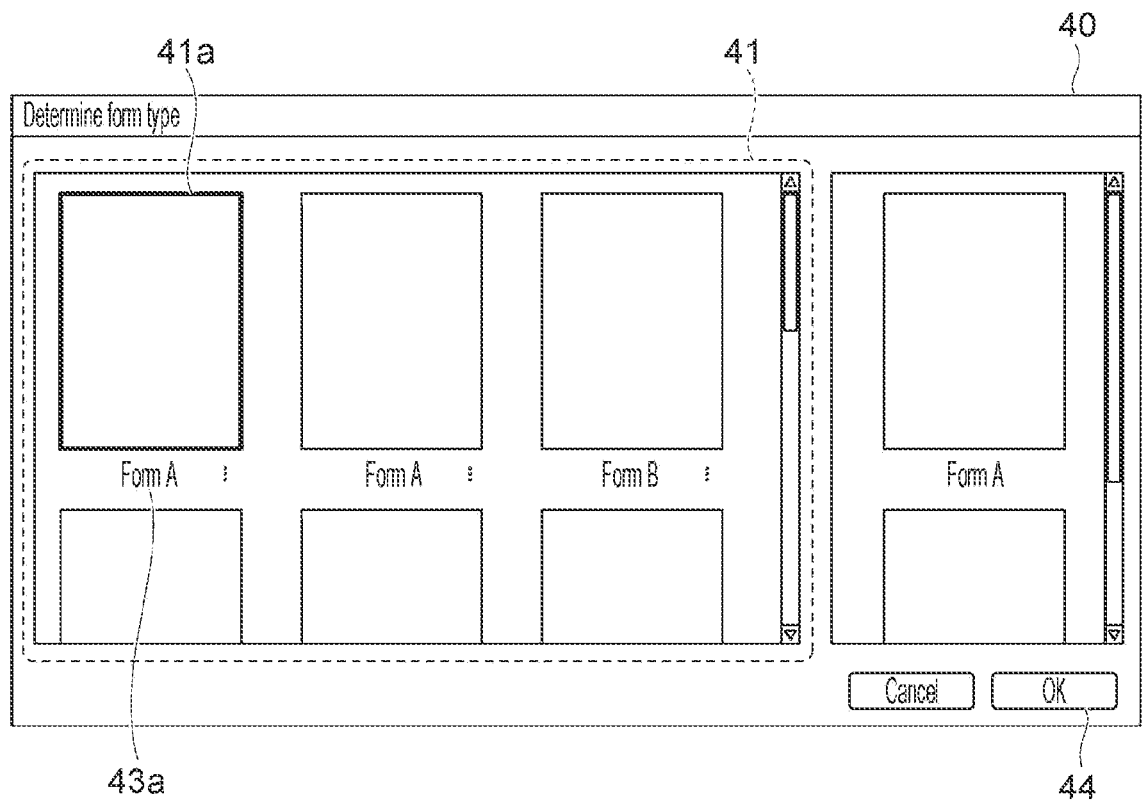

With this user operation, as shown in FIG. 6B, "form A" is displayed as the form type 43a in the result display region 43, so that the form type "unknown" of the subject image 41a is changed to "form A". The screen 40 in FIG. 6B corresponds to step S104 in the flowchart of FIG. 3 in which a correction is received.

To proceed to the next screen, the user places the cursor 45 over the instruction region 44 and clicks.

FIGS. 7A and 7B illustrate a screen 40 when a user corrects a classification processing result. The screen 40 in FIGS. 7A and 7B is shown in chronological order. FIG. 7A corresponds to FIG. 5A, and FIG. 7B corresponds to FIG. 6B.

The classification processing result of the subject image 41a is "form B". After the user has checked that the form type of the subject image 41a is not "form A", but "form B", the subject image 41a is set in the selection state, as discussed with reference to FIG. 5B.

Then, when the user places the cursor 45 over the preregistered image 42a whose form type is "form A" and clicks, as discussed with reference to FIG. 6A, "form A" is displayed as the form type 43a in the result display region 43, as shown in FIG. 7B. Then, the user places the cursor 45 over the instruction region 44 and clicks. The form type of the subject image 41a is then changed to "form A".

As described above, a user does checking/correcting work for the classification processing results displayed in the result display region 43 on the screen 40. More specifically, the user checks whether each image subjected to classification processing in the subject image display region 41 is classified as a correct form type by comparing the subject images with the preregistered images on the screen 40, and if there is any unclassified image, the user specifies a form type of this image. In this manner, the user can do checking/correcting work without shifting the screen. This reduces the number of transition times of the screen, which decreases the burden on the user.

Figure 8A:
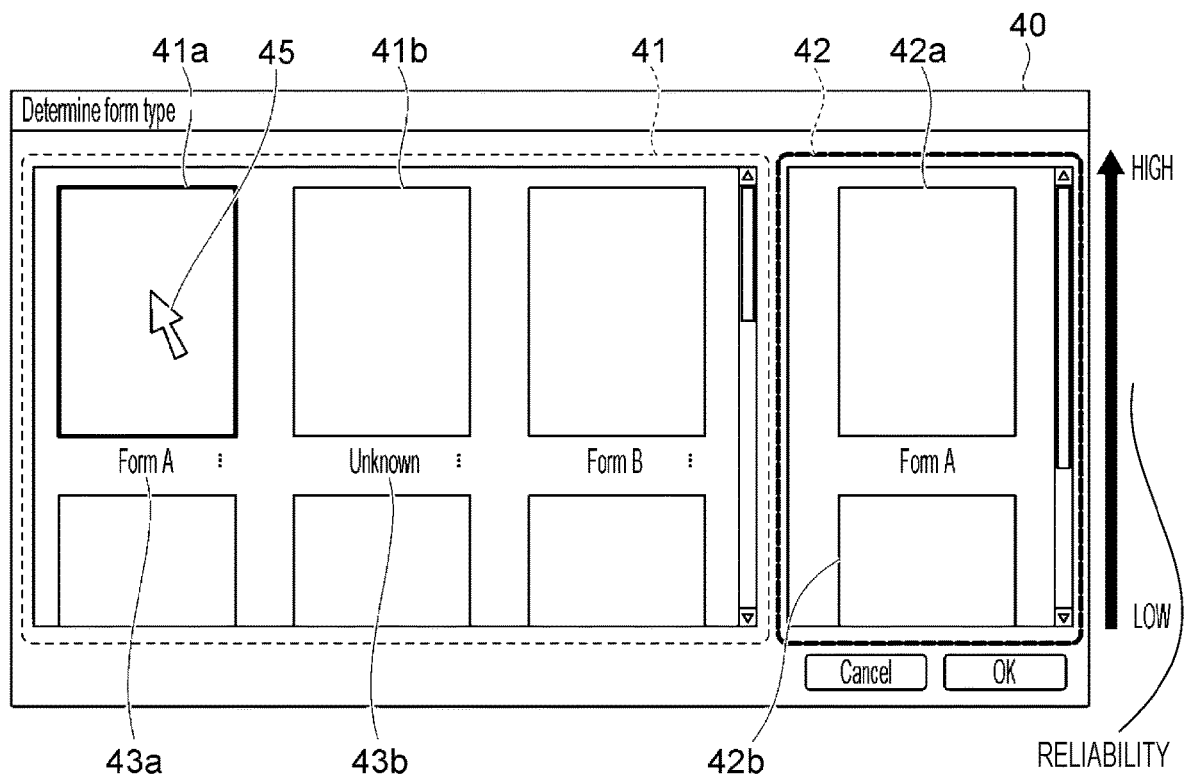
FIGS. 8A and 8B each illustrate a screen on which preregistered images are arranged in accordance with the reliability while an image subjected to classification processing is being selected.
Figure 8B:
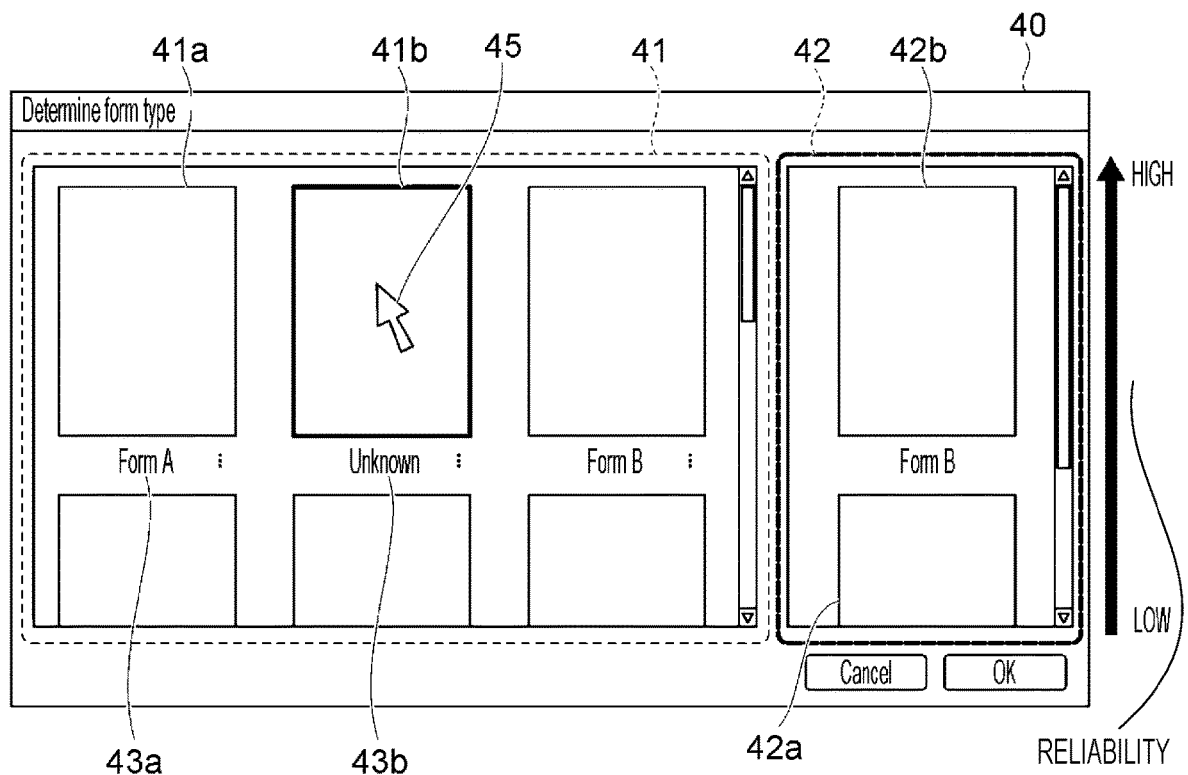
Figure 9A:
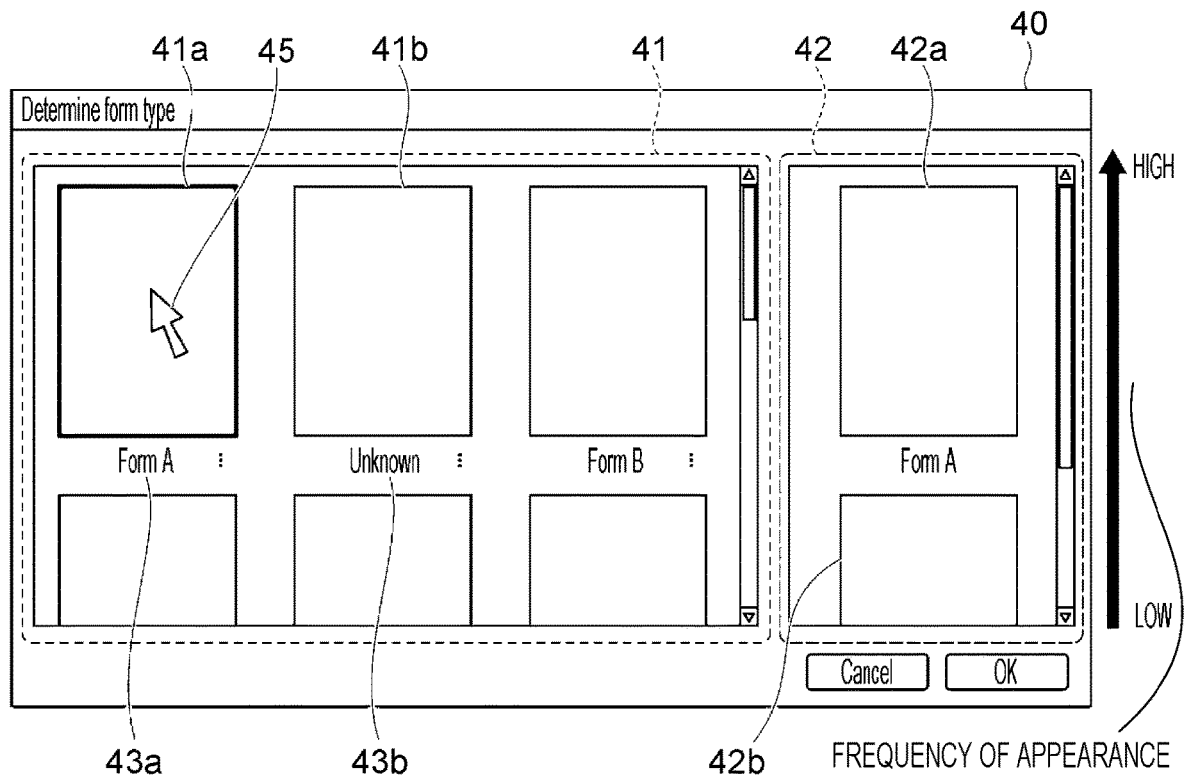
FIGS. 9A and 9B each illustrate a screen on which preregistered images are arranged in accordance with the frequency of appearance while an image subjected to classification processing is being selected.
Figure 9B:
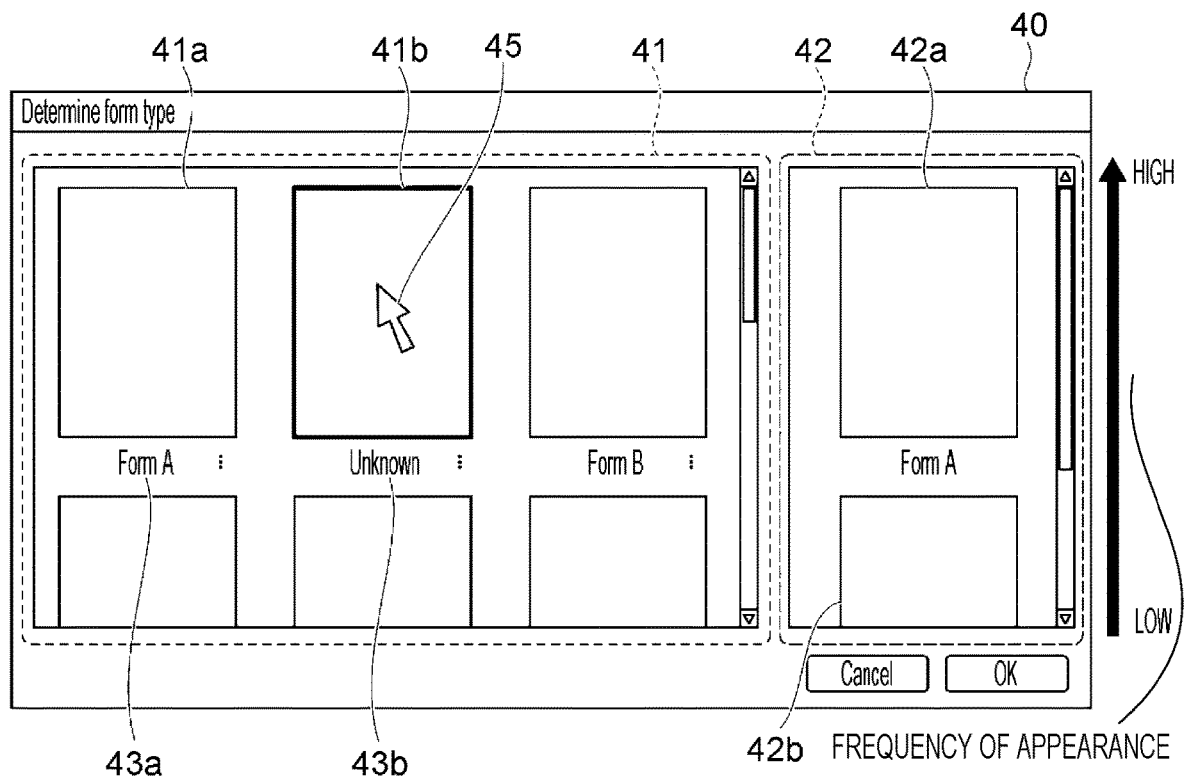
Figure 10C:
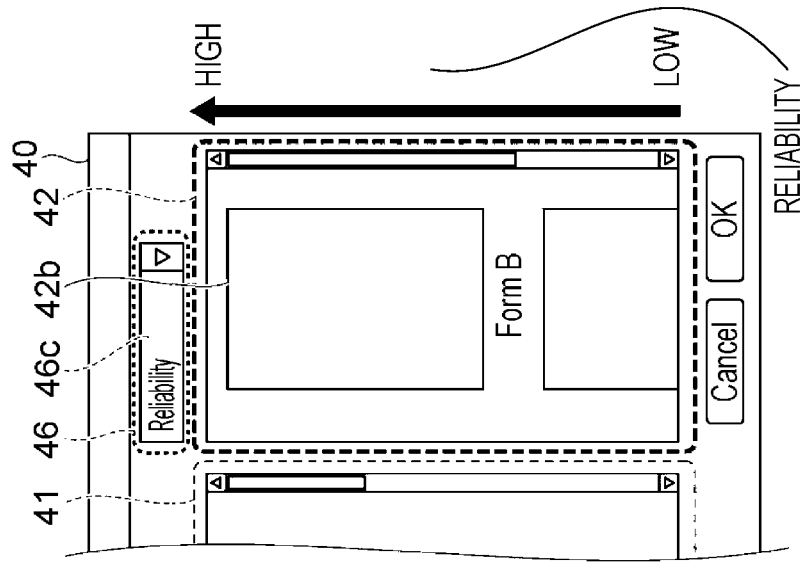
FIGS. 10A through 10C each illustrate a screen on which a user has set the arrangement order of preregistered images.
Figure 10B:
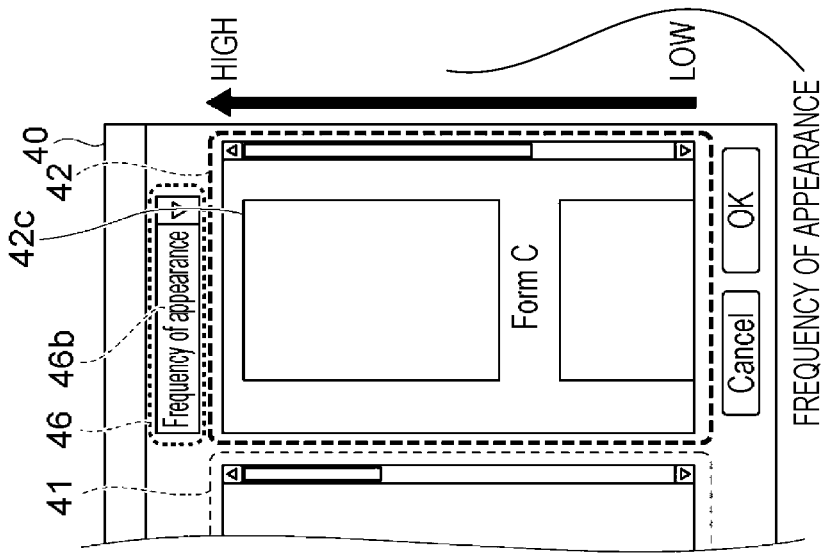
Figure 10A:
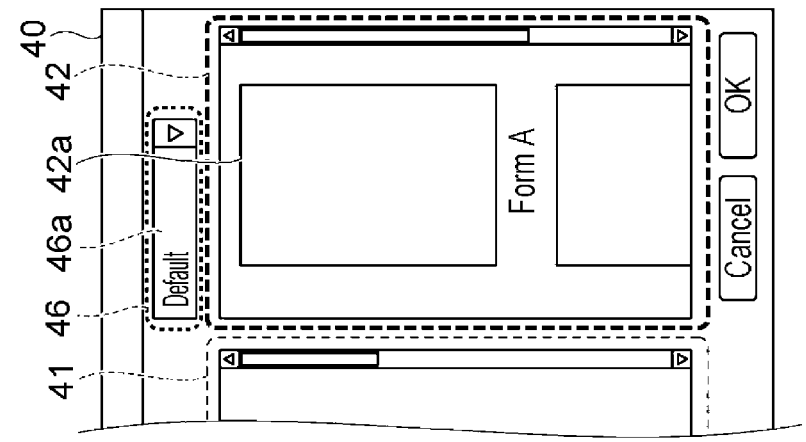

An explanation will now be given of the displaying of preregistered images in the preregistered image display region 42 when a user checks classification processing results. FIGS. 8A and 8B illustrate a case in which preregistered images in the preregistered image display region 42 are rearranged in accordance with the reliability. FIGS. 9A and 9B illustrate a case in which preregistered images in the preregistered image display region 42 are rearranged in accordance with the frequency of appearance. FIGS. 10A through 10C illustrate a case in which a user has set the arrangement order of preregistered images in the preregistered image display region 42.

The preregistered images are displayed in a predetermined arrangement order. In the exemplary embodiment, a user can select whether the preregistered images are arranged in descending order of reliability or frequency of appearance.

The reliability represents the degree by which a preregistered image is similar to an image subjected to classification processing in the selection state. The form type of the preregistered image having the highest degree of reliability for a certain subject image is set to be the form type of this subject image as a classification processing result. If, for example, the difference between the highest degree of reliability and the second highest degree of reliability for a certain subject image is smaller than a predetermined threshold, the form type of this subject image may be set to be "unknown".

The frequency of appearance is determined as follows. For each form type, the number of images subjected to classification processing displayed in the subject image display region 41 that are classified as a certain form type is counted. The form type as which a larger number of subject images are classified is set to be the form type having a higher frequency degree of appearance. To count the number of subject images classified as a form type, subject images currently displayed in the subject image display region 41 may be counted, or subject images including those displayed in the past may be counted.

FIGS. 8A and 8B illustrate a screen 40 when preregistered images are arranged in accordance with the reliability. FIG. 8A shows the arrangement of the preregistered images in the preregistered image display region 42 when the subject image 41a is being selected in the subject image display region 41. FIG. 8B shows the arrangement of the preregistered images when the subject image 41b is being selected in the subject image display region 41.

As shown in FIG. 8A, when the subject image 41a is being selected, "form A", which is determined to have the highest degree of reliability, is displayed at a high position in the preregistered image display region 42. As shown in FIG. 8B, when the subject image 41b is being selected, "form B", which is determined to have the highest degree of reliability, is displayed at a high position in the preregistered image display region 42.

In this manner, when the subject image 41a, which is located at the first position in the subject image display region 41, shown in FIG. 8A is being selected, the preregistered images in the preregistered image display region 42 are arranged in descending order of the degree of reliability for the subject image 41a. When the subject image 41b, which is located at the second position in the subject image display region 41, shown in FIG. 8A is being selected, the preregistered images in the preregistered image display region 42 are arranged in descending order of the degree of reliability for the subject image 41b.

This enables a user to first check the preregistered image having the highest degree of reliability for a selected subject image without scrolling on the screen 40, thereby enhancing the efficiency of checking work.

"Displaying a preregistered image at a high position" refers to that the preregistered image is displayed at a position at which a user can view this preregistered image without scrolling up and down on the screen 40. "Displaying of a preregistered image at a high position" may not necessarily be achieved by rearranging the preregistered images in the preregistered image display region 42 as shown in FIGS. 8A and 8B. That is, a group of preregistered images may not necessarily be rearranged from the top to the bottom in the preregistered image display region 42. Instead, for example, a preregistered image having a high degree of reliability may be preferentially displayed in the preregistered image display region 42 so that a user can view this preregistered image without scrolling up and down on the screen 40.

FIGS. 9A and 9B illustrate a screen 40 when preregistered images are arranged in accordance with the frequency of appearance. FIG. 9A shows the arrangement of the preregistered images in the preregistered image display region 42 when the subject image 41a is being selected in the subject image display region 41. FIG. 9B shows the arrangement of the preregistered images in the preregistered image display region 42 when the subject image 41b is being selected in the subject image display region 41.

As shown in FIG. 9A, when the subject image 41a is being selected, "form A", which is determined to have the highest frequency degree of appearance, is displayed at a high position in the preregistered image display region 42. As shown in FIG. 9B, when the subject image 41b is being selected, "form A" is also displayed at a high position in the preregistered image display region 42. That is, in the case of FIGS. 9A and 9B, the arrangement of preregistered images is not influenced by a selected subject image, unlike the case in FIGS. 8A and 8B.

This enables a user to first check the preregistered image having the highest frequency degree of appearance without scrolling on the screen 40, thereby enhancing the efficiency of checking work.

FIGS. 10A through 10C illustrate a screen 40 when the arrangement of a group of preregistered images is changed by a user. FIG. 10A illustrates the screen 40 in the case of a default arrangement of preregistered images. FIG. 10B illustrates the screen 40 when preregistered images are arranged in descending order of the frequency of appearance. FIG. 10C illustrates the screen 40 when preregistered images are arranged in descending order of the reliability.

As shown in FIGS. 10A through 10C, an arrangement-type selecting section 46 is displayed above the preregistered image display region 42. The arrangement-type selecting section 46 is a drop-down menu from which a user can select one of a default option 46a in FIG. 10A, a frequency-of-appearance option 46b in FIG. 10B, and a reliability option 46c in FIG. 10C. Since the displaying of a group of images subjected to classification processing in the subject image display region 41 is not changed, only part of the subject image display region 41 is shown in FIGS. 10A through 10C.

When the default option 46a is selected, the preregistered images in the preregistered image display region 42 are displayed in the order when they are registered, as shown in FIG. 10A. When the frequency-of-appearance option 46b is selected, the preregistered images in the preregistered image display region 42 are arranged in descending order of the frequency of appearance, as shown in FIG. 10B. When the reliability option 46c is selected, the preregistered images in the preregistered image display region 42 are arranged in descending order of the reliability, as shown in FIG. 10C.

Every time an option in the arrangement-type selecting section 46 is selected, all the preregistered images in the preregistered image display region 42 are rearranged.

An explanation will now be given of the displaying of subject images in the subject image display region 41 when a user checks classification processing results.

Figure 11A:
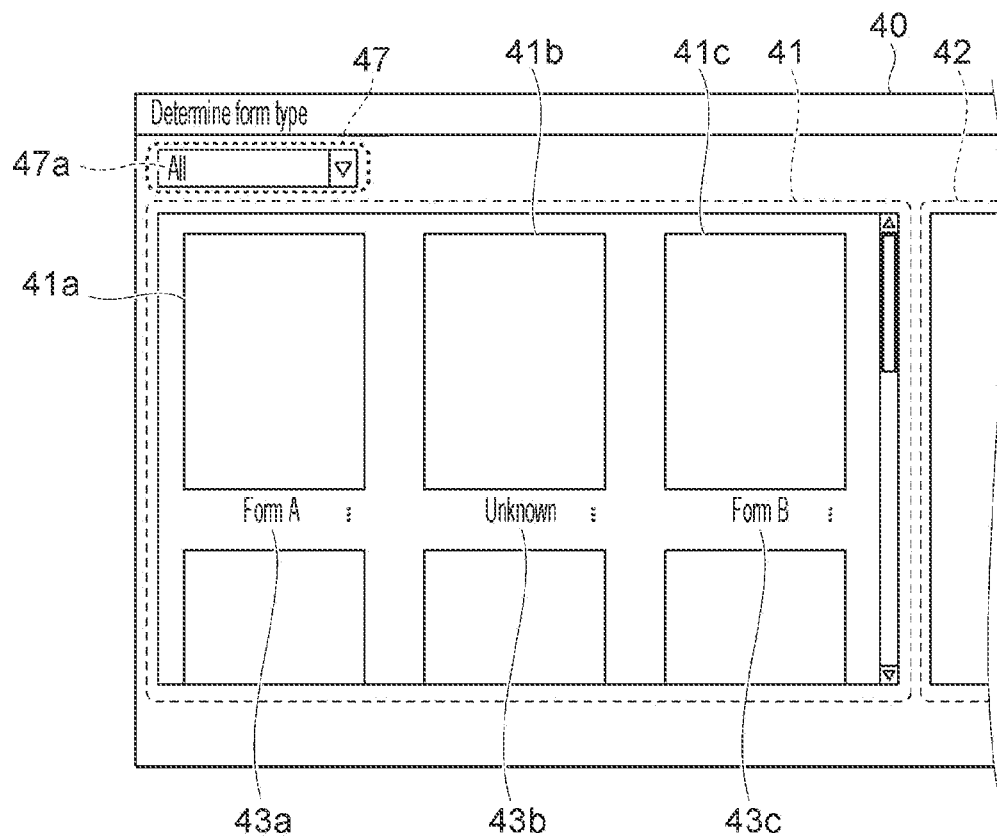
FIGS. 11A through 12B each illustrate a screen on which a user has selected images subjected to classification processing to be displayed.
Figure 11B:
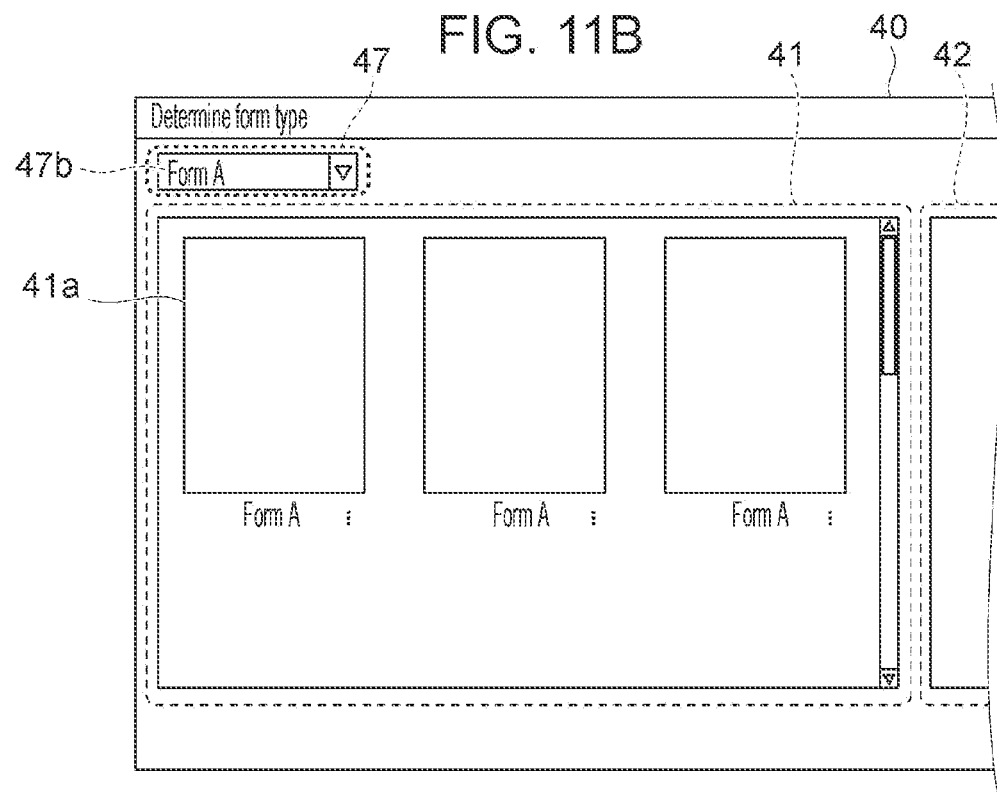
Figure 12A:
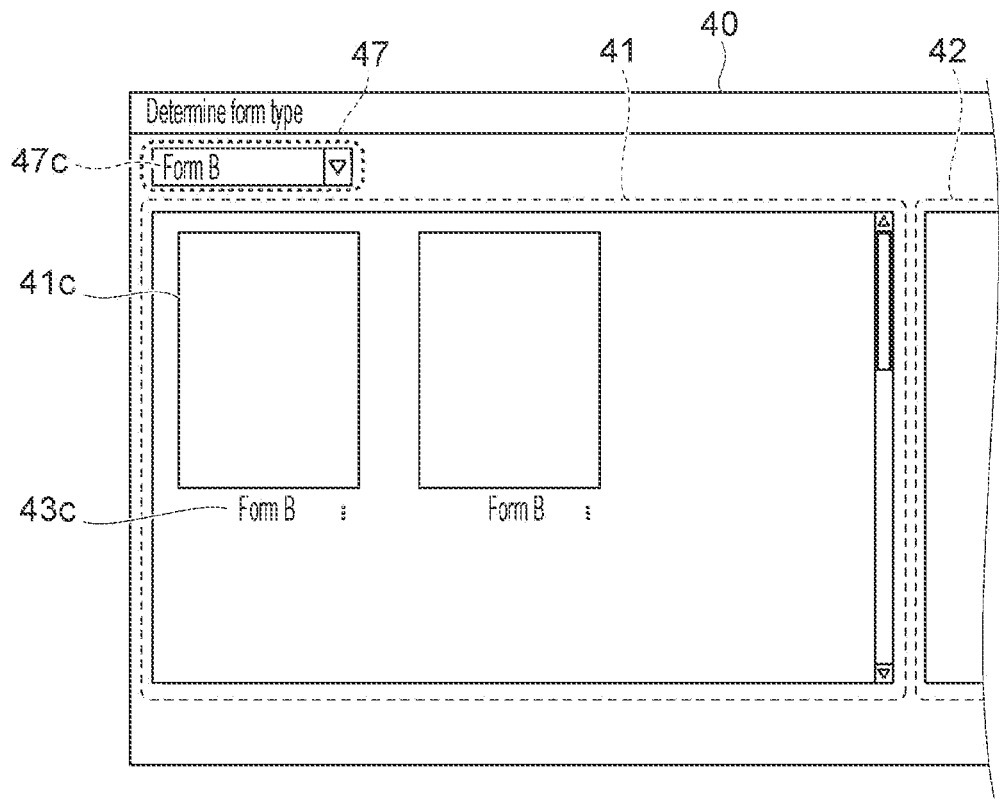
Figure 12B:
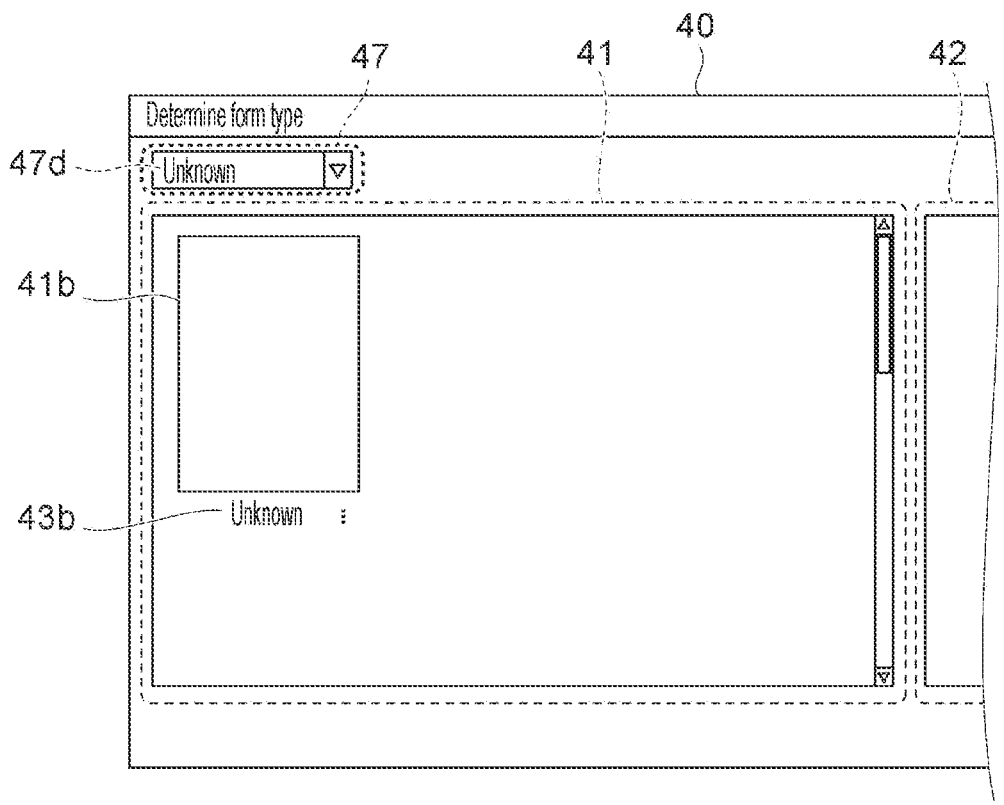

FIGS. 11A through 12B illustrate a screen 40 when a user has selected subject images to be displayed. FIG. 11A illustrates the screen 40 when all subject images are displayed. FIG. 11B illustrates the display 40 when subject images of form A are displayed. FIG. 12A illustrates the display 40 when subject images of form B are displayed. FIG. 12B illustrates the display 40 when images whose form type is unknown are displayed. Since the displaying of a group of preregistered images in the preregistered image display region 42 is not changed, only part of the preregistered image display region 42 is shown in FIGS. 11A through 12B.

As shown in FIGS. 11A through 12B, a form-type selecting section 47 is displayed above the subject image display region 41. The form-type selecting section 47 is a drop-down menu from which a user can select one of an all-image option 47a in FIG. 11A, a form-A-type option 47b in FIG. 11B, a form-B-type option 47c in FIG. 12A, and a form-type-unknown-image option 47d in FIG. 12B.

As shown in FIG. 11A, when the all-image option 47a is selected, all the subject images are displayed in the subject image display region 41. That is, the subject images are not filtered. As shown in FIG. 11B, when the form-A-type option 47b is selected, the subject images classified as form A are selected by filtering and are displayed in the subject image display region 41.

As shown in FIG. 12A, when the form-B-type option 47c is selected, the subject images classified as form B are selected by filtering and are displayed in the subject image display region 41. As shown in FIG. 12B, when the form-type-unknown-image option 47d is selected, the subject images whose form type is unknown are selected by filtering and are displayed in the subject image display region 41.

In this manner, the number of subject images to be displayed in the subject image display region 41 can be reduced by using the form-type selecting section 47. That is, all the subject images are displayed when the all-image option 47a is selected, however, subject images to be displayed in the subject image display region 41 are selected by filtering when one of the form-A-type option 47b, the form-B-type option 47c, and the form-type-unknown-image option 47d is selected. This reduces the number of subject images to be displayed and thus enhances checking work for classification processing results.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
obtain a plurality of first document images;
execute classification processing for classifying each of the plurality of first document images, based on reliability of each of a plurality of second document images in relation to each of the plurality of first document images, each of the plurality of second document images being preset in accordance with a classification type; and
perform display control to display a first group of the plurality of first document images and a second group of the plurality of second document images on an identical screen and also to display results of the classification processing on the identical screen,
wherein the processor is configured to perform the display control to display the plurality of second document images of the second group in a predetermined arrangement order, and
the predetermined arrangement order is an order of frequency of appearance determined based on the results of the classification processing.

2. The information processing apparatus according to claim 1, wherein the processor is configured to perform the display control to:
select one of the plurality of first document images in the first group and one of the plurality of second document images in the second group displayed on the identical screen; and
determine a classification type of the selected first document image to be the same classification type as the selected second document image.

3. The information processing apparatus according to claim 2, wherein the result of the classification processing of the selected first document image indicates that the selected first document image is not classified as any classification type.

4. The information processing apparatus according to claim 2, wherein the result of the classification processing of the selected first document image indicates that the selected first document image is classified as a classification type different from the classification type of the selected second document image.

5. The information processing apparatus according to claim 1, wherein the number of the first document images to be displayed on the identical screen is reduced based on the results of the classification processing.

6. A non-transitory computer readable medium storing a program causing a computer to execute a process, the process comprising:
obtaining a plurality of first document images;
executing classification processing for classifying each of the plurality of first document images, based on reliability of each of a plurality of second document images in relation to each of the plurality of first document images, each of the plurality of second document images being preset in accordance with a classification type; and
performing display control to display a first group of the plurality of first document images and a second group of the plurality of second document images on an identical screen and also to display results of the classification processing on the identical screen,
wherein the process further comprises performing the display control to display the plurality of second document images of the second group in a predetermined arrangement order, and
the predetermined arrangement order is an order of frequency of appearance determined based on the results of the classification processing.

7. An information processing method comprising:
obtaining a plurality of first document images;
executing classification processing for classifying each of the plurality of first document images, based on reliability of each of a plurality of second document images in relation to each of the plurality of first document images, each of the plurality of second document images being preset in accordance with a classification type; and
performing display control to display a first group of the plurality of first document images and a second group of the plurality of second document images on an identical screen and also to display results of the classification processing on the identical screen,
wherein the method further comprises performing the display control to display the plurality of second document images of the second group in a predetermined arrangement order, and
the predetermined arrangement order is an order of frequency of appearance determined based on the results of the classification processing.

* * * * *